United States Patent [19]

Murai et al.

[11] Patent Number: 5,788,354
[45] Date of Patent: Aug. 4, 1998

[54] PROJECTION TYPE DISPLAY

[75] Inventors: Hiroyuki Murai; Kunifumi Nakanishi, both of Miyoshi, Japan

[73] Assignee: Kabushiki Kaisha Advanced Display, Kumamoto, Japan

[21] Appl. No.: 743,296

[22] Filed: Nov. 5, 1996

[30] Foreign Application Priority Data

Nov. 6, 1995 [JP] Japan .................. 7-286965

[51] Int. Cl.[6] .................................................. G03B 21/14
[52] U.S. Cl. .......................... 353/97; 353/30; 349/5; 349/74
[58] Field of Search ..................... 353/97, 30, 31; 349/5, 16, 74, 81, 83

[56] References Cited

U.S. PATENT DOCUMENTS

| 5,379,083 | 1/1995 | Tomita ........................ 353/97 |
| 5,579,136 | 11/1996 | Fukui et al. .................. 349/74 |
| 5,597,223 | 1/1997 | Watanabe .................... 353/97 |
| 5,622,418 | 4/1997 | Daijogo et al. ............... 353/97 |

FOREIGN PATENT DOCUMENTS 6053934  3/1985  Japan ........................ 349/81

*Primary Examiner*—William Dowling
*Attorney, Agent, or Firm*—Lowe, Price, LeBlanc & Becker

[57] ABSTRACT

A projection type display in which contrast of projected picture is improved without negatively affecting luminance of a projected picture. The projection type display comprises a main light bulb 3 wherein an illumination light flux 2 from a light source 1 is transmitted or scattered according to a display picture image formed by a control signal from a control circuit 9, and an auxiliary light bulb 17 wherein the illumination light flux 2 transmitted or scattered by the main light bulb 3 is transmitted or scattered according to the control signal from the control circuit 9. The light flux having transmitted through the auxiliary light bulb 17 is enlargedly projected by a projecting lens 7 via a diaphragm 6 condensed by a condensing lens 4, and is subjected to image-formation on a screen 8.

8 Claims, 4 Drawing Sheets

PROJECTION TYPE DISPLAY

BACKGROUND OF THE INVENTION

1. Industrial Field

The present invention relates to a projection type display in which a picture image is displayed enlargedly on a screen using a liquid crystal light bulb which performs image modulation by transmission or scattering of light and, more particularly, to an liquid crystal light bulb.

2. Prior Art

In the conventional liquid crystal projectors for enlargedly displaying an image of a liquid crystal light bulb, there has been a problem of how to achieve improvement in efficiency and luminance. That is, in the conventional liquid projector, a polarized light has been modulated by means of polarizing element and substantially a half of light flux has not been effectively utilized, resulting in very low utilization efficiency of light flux. Recently, a new liquid crystal mode of light modulation material called Polymer Dispersed Liquid Crystal (PDLC) has been developed, in which any polarizing element is not required and an incoming light is modulated on the basis of diffusivity or scattering characteristic.

FIG. 4 is a schematic view showing an arrangement of a projection type display using such a known liquid crystal mode. FIG. 5 is a schematic view showing an arrangement of an active matrix type liquid crystal light bulb. In FIG. 4, reference numeral 1 designates a light source, numeral 2 designates an illumination light flux emitted and outgoing from the light source 1, numeral 3 is a main light bulb which is an active matrix type liquid crystal light bulb, numeral 4 is a condensing lens, numeral 5 is a light not utilized (i.e., unnecessary light), numeral 6 is a diaphragm for eliminating the unnecessary light 5, numeral 7 is a projecting lens for enlargedly projecting a picture image to be displayed, numeral 8 is a screen, and numeral 9 is a control circuit for driving the main light bulb 3.

In FIG. 5, a reference numeral 10 designates an active matrix substrate, numeral 11 designates an opposite electrode, numeral 12 is a switching device, 13 is a transparent electrode arranged on the active matrix substrate 10 corresponding to picture elements of the picture image and forming a matrix together with the switching device 12. Numeral 14 denotes a common transparent electrode formed on the opposite electrode 11, and numeral 15 is a polymer dispersed liquid crystal through which light flux is transmitted or scattered according to a voltage applied thereto, and which is held between the active matrix substrate 10 and the opposite electrode 11. Numeral 16 is a spacer for supporting the active matrix substrate 10 and the opposite electrode 11.

The conventional projection type display of above arrangement performs a following function. The illumination light flux 2 emitted from the light source 1 in the form of parallel light flux is applied to the main light bulb 3. On the surface of the main light bulb 3 being an active matrix type liquid crystal bulb, a picture image is displayed by signals written from the control circuit 9, and the light flux 2 incoming to the main light bulb 3 is transmitted otherwise scattered according to gradation of the displayed picture image.

The light flux (solid line in FIG. 4) not scattered in the main light bulb 3 but transmitted therethrough and outgoing perpendicularly to the display surface is condensed on the diaphragm by the condensing lens 4, and incoming to the projecting lens 7 after passing the diaphragm 6. On the other hand, the unnecessary light 5 (broken line) of the light flux transmitted through the condensing lens 4 is intercepted by the diaphragm 6 and not incoming to the projecting lens 7. In other words, the diaphragm 6 intercepts selectively the unnecessary light 5, and only the light flux not scattered in the main light bulb 3 but transmitted therethrough and outgoing almost perpendicularly to the display surface is selectively delivered to the projecting lens 7, thereby contrast being improved. The light flux outgoing from the projecting lens 7 is then enlargedly formed into a picture image on the screen 8 to be watched.

In the projection type display of above arrangement, a problem exists in that, although the contrast of the projected picture may be improved by making small the aperture diameter of the diaphragm 6, a part of the transmission light is intercepted by the diaphragm 6 because of imperfect parallelism of the illumination light flux 2, thus resulting in a considerable reduction in luminance of the projected picture.

It is certain that contrast of the projected picture may be improved by thickening the polymer dispersed liquid crystal 15 and increasing the scattering power of the main light bulb 3. But, in this case, driving voltage of the polymer dispersed liquid crystal 15 becomes high in proportion to the thickness of liquid crystal layer. The polymer dispersed liquid crystal 15 is operated by the switching device 12 on the active matrix substrate 10 at a signal voltage written in the transparent electrode 13. However, when the driving voltage of the polymer dispersed liquid crystal 15 is high, it becomes difficult to apply a sufficient voltage by the switching device 12. Accordingly, another problem exists in that the polymer dispersed liquid crystal 15 does not reach a full transmission state, resulting in reduction in luminance of the projected picture.

Moreover, to keep constant the thickness of the polymer dispersed liquid crystal 15 layer, the spacer 16 is incorporated in the main light bulb 3. Accordingly, in the portion where the spacer 16 is in contact with the active matrix substrate 10 and opposite electrode 11, any light is not scattered but the light flux 2 is transmitted therethrough at all times. As a result, a further problem exists in that light leak takes place at the spacer 6 portion particularly at the time of displaying black, resulting in poor quality of the projected picture.

SUMMARY OF THE INVENTION

The present invention was made to solve the above-discussed problems and has an object of providing a projection type display in which luminance of projected picture is not largely reduced, and a visually high contrast may be achieved.

To accomplish the foregoing object, in one aspect of the invention, a projection type display comprises: a liquid crystal light bulb having a main light bulb in which a light flux is emitted from a light source and transmitted otherwise scattered therethrough by a first control signal according to a display image formed, and an auxiliary light bulb in which the light flux is transmitted therethrough otherwise scattered by a second control signal; a projecting lens by which the light flux transmitted through said liquid crystal light bulb is enlargedly projected after passing through a diaphragm arranged at a location where the light flux is condensed by a condensing lens; a screen on which the light flux projected enlargedly by said projecting lens is formed into a picture image; and a control circuit for generating the first control signal and the second control signal.

In another aspect of the invention, said main light bulb is disposed upstream said auxiliary light bulb, whereby the auxiliary light bulb is irradiated with the light flux transmitted or scattered through said main light bulb.

In a further aspect of the invention, said main light bulb is disposed downstream said auxiliary light bulb, whereby the main light bulb is irradiated with the light flux transmitted or scattered through said auxiliary light bulb.

In a yet further aspect of the invention, one glass substrate of said main light bulb serves also as one glass substrate of said auxiliary light bulb to be commonly used.

In a still further aspect of the invention, said main light bulb is an active matrix type liquid crystal light bulb in which switching device and transparent electrode are disposed in a form of matrix.

In a further aspect of the invention, said auxiliary light bulb is an active matrix type liquid crystal light bulb in which switching device and transparent electrode are disposed in a form of matrix.

In a yet further aspect of the invention, said auxiliary light bulb is a single element type liquid crystal light bulb.

In a still further aspect of the invention, said auxiliary light bulb is a simple matrix type liquid crystal light bulb in which upper and lower striped transparent electrodes are orthogonal each other.

Other objects, features and advantages of the invention will become apparent in the course of the following description with reference to the accompanying drawings.

DESCRIPTION OF THE PREFERRED EMBODIMENTS

EXAMPLE 1

Figure 1:
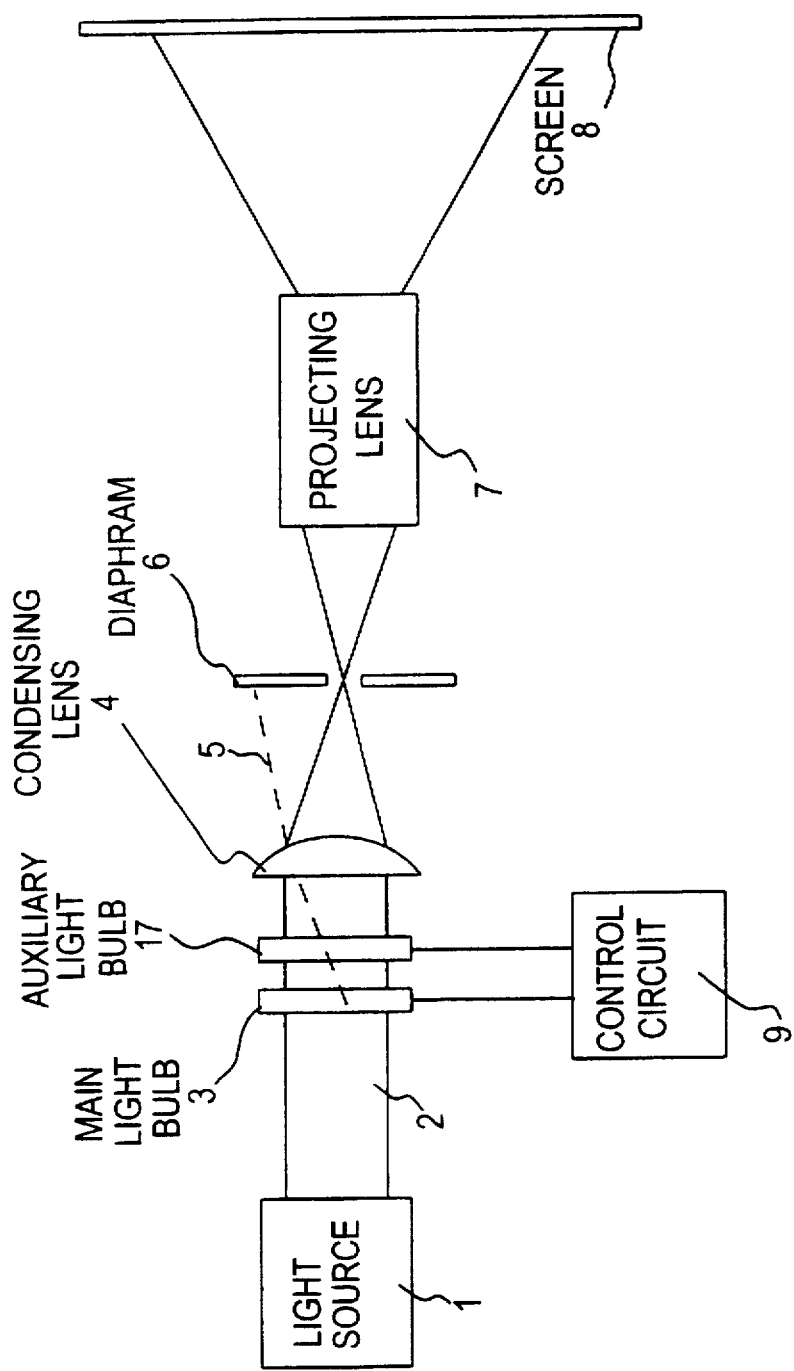
FIG. 1 is a schematic view showing an arrangement of a projection type display according to example 1 of the present invention.
Figure 2:
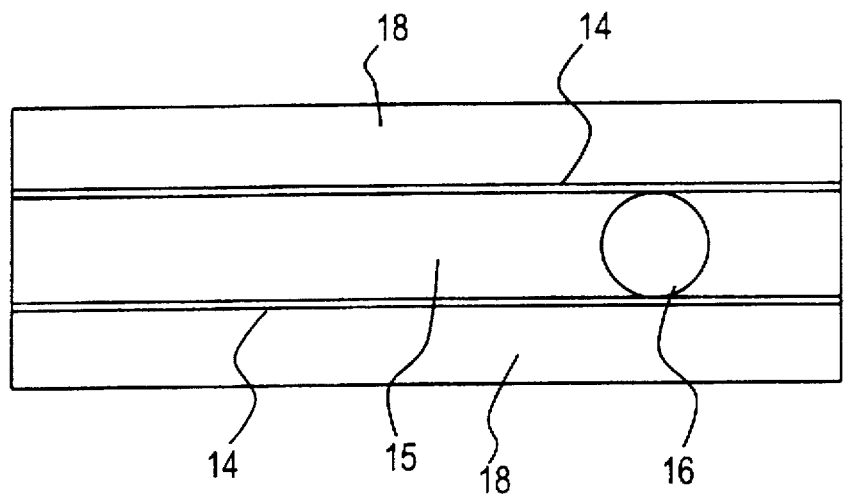
FIG. 2 is a schematic view showing an arrangement of a single element type liquid crystal light bulb used in the projection type display according to example 1 of the invention.

FIG. 1 is a schematic view showing an arrangement of a projection type display according to example 1 of the present invention, and FIG. 2 is a schematic view showing an arrangement of a single element type liquid crystal light bulb used in the projection type display according to example 1. In FIG. 1, reference numerals 1 to 9 designate the same parts as the aforementioned conventional display and, therefore, repetition of description is omitted herein. Numeral 17 designates an auxiliary light bulb being a single element type liquid crystal light bulb.

Figure 5:
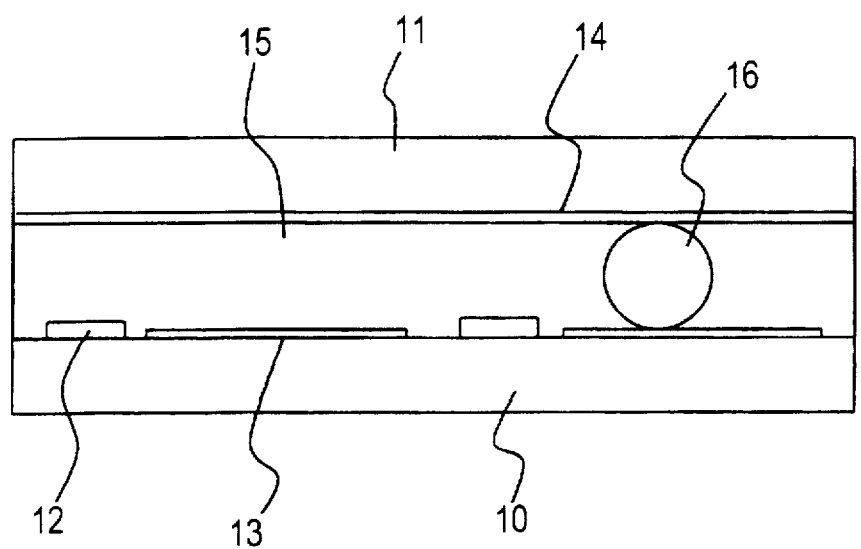
FIG. 5 is a schematic view showing an arrangement of an active matrix type liquid crystal light bulb.

In FIG. 2, reference numeral 14 to 16 designate the same parts as those shown in FIG. 5 and repetition of description is omitted herein. Numeral 18 designate glass substrates each having a common transparent electrode 14. The polymer dispersed liquid crystal 15 is held between the two glass substrates by interposing the spacer 16 therebetween, and the entire surface of the auxiliary light bulb 17 varies from a transmission state to a scattering state according to signals from outside.

Operation of the projection type display of example 1 is hereinafter described. The illumination light flux 2 emitted from the light source 1 in the form of parallel light flux is applied to the main light bulb 3. A picture image is displayed on the surface of the main light bulb 3 by the signal written from the control circuit 9, and the illumination light flux 2 incoming to the main light bulb 3 is transmitted otherwise scattered according to gradation of the displayed image. The light flux transmitted or scattered in this way further comes in the auxiliary light bulb 17.

The entire light flux incoming to the auxiliary light bulb 17 is further transmitted otherwise scattered by the driving signal from the control circuit 9 according to brightness of projection surrounding (environment) and average luminance of the picture image.

In case that projection surrounding is bright and black level on the screen 8 is determined depending upon the light from outside, contrast in the projection type display itself is sufficient when it is at least 20, and contrast on the screen 8 is dominated by maximum luminance of the projected picture. In this case, while keeping the auxiliary light bulb 17 in the transmission state at all times, the light flux modulated in the main light bulb 3 is emitted as it is.

On the other hand, in case of sufficiently dark surrounding, in view of visually improving picture quality of the projected picture image, it is important to lower the luminance of the black level particularly at the time of displaying black and reduce local light leak. To do this, the auxiliary light bulb 17 is driven by the luminance signal according to the average luminance of the picture image, and the entire light flux modulated in the main light bulb 3 is further modulated. For example, when the contrast obtained in the main light bulb 3 itself is 20, the auxiliary light bulb 17 is driven so that transmissivity at the time of displaying black is 10% of that at the time of displaying white. In this case, while contrast in each frame of the projection image being left to be 20, the luminance at the time of displaying black may be reduced to 0.5% of that at the time of displaying white. In this operation, as there is less probability of overlapping the spacers of the two layers of light bulbs each other, the local light leak due to the spacer may be restrained to 10% of the entire luminance at the worst. As a result, while keeping substantially the same brightness of the projected picture image at the time of displaying white, the picture quality at the time of displaying black may be significantly improved.

Figure 4:
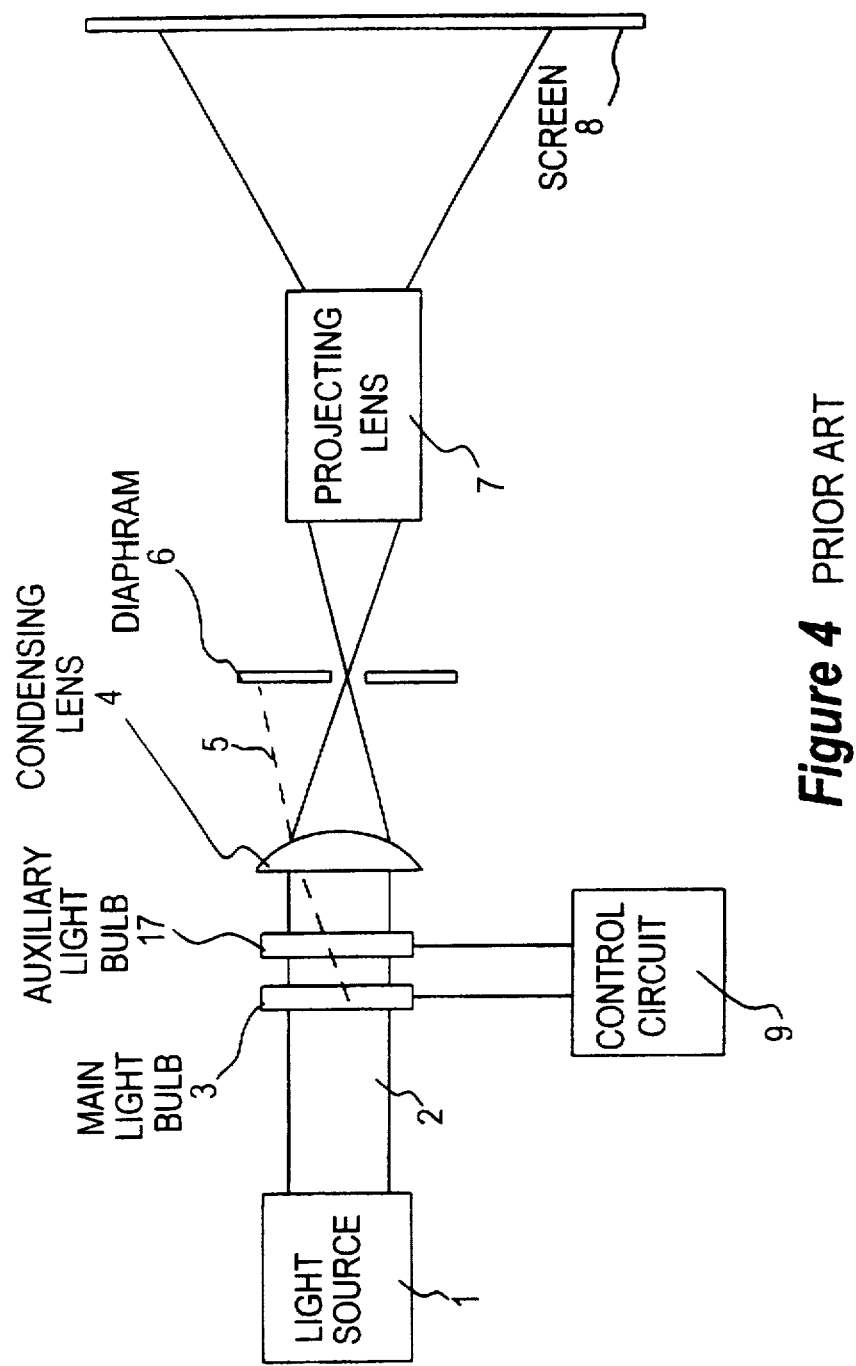
FIG. 4 is a schematic view showing an arrangement of a conventional projection type display.

In addition, the light flux emitted from the auxiliary light bulb 17 is condensed on the diaphragm 6 by the condensing lens and image-formed enlargedly on the screen 8 through the projecting lens 7 in the same manner as the conventional projection type display shown in FIG. 4.

EXAMPLE 2

Figure 3:
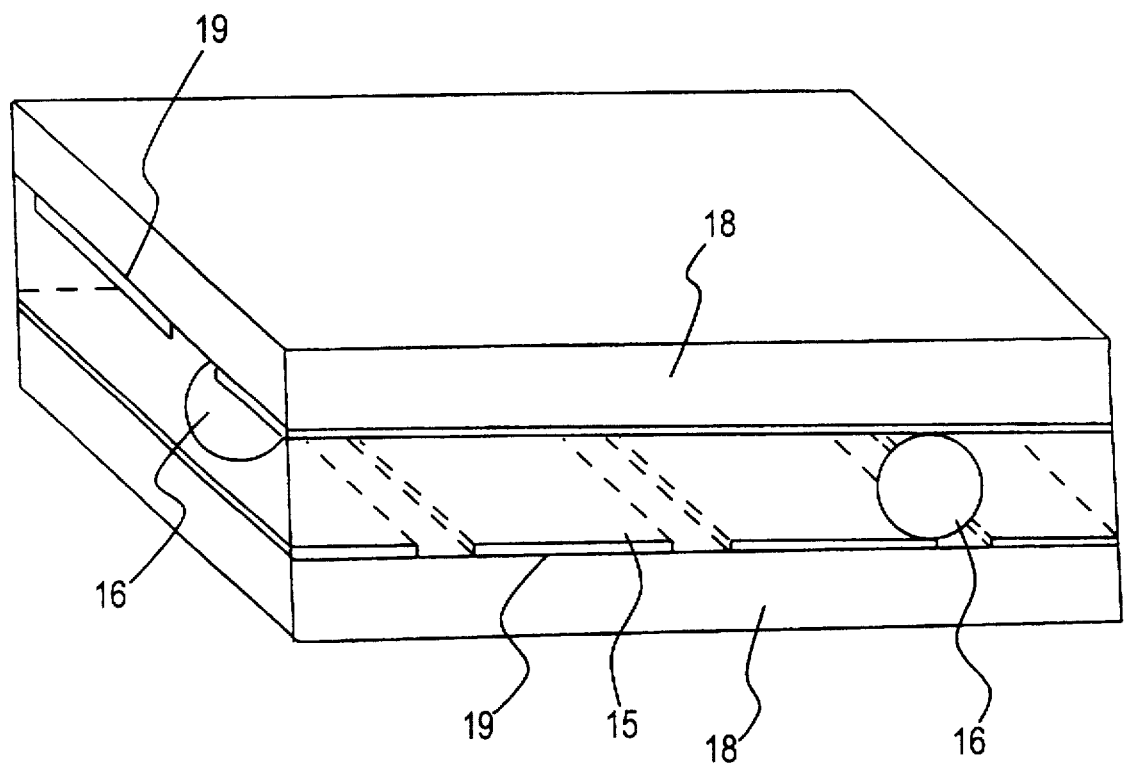
FIG. 3 is a schematic perspective view showing a simple matrix type liquid crystal light bulb used in the projection type display according example 2 of the invention.

Another projection type display according to example 2 of the invention is hereinafter described. Arrangement of the projection type display of this example is substantially the same as the foregoing example 1 shown in FIG. 1, except that a simple matrix type liquid crystal light bulb is used instead of the auxiliary light bulb 17. FIG. 3 shows the simple matrix type liquid crystal light bulb used in the projection type display according to example 2.

In FIG. 3, numerals 15 to 18 designate the same parts as those shown in FIG. 2 and, therefore, repetition of description is omitted herein. Numeral 19 designates striped transparent electrodes each formed on glass substrates 18, and a polymer dispersed liquid crystal 15 filled evenly is held between the upper and lower striped transparent electrodes 19 orthogonal each other. When an electric field is applied vertically at overlapping portions of the upper and lower striped transparent electrodes 19, the overlapping portions perform as picture elements and cause each picture element to vary between transmission state and scattering state according to the signal from outside. The light flux incoming to the auxiliary light bulb 17 is further transmitted otherwise scattered for each picture element by the driving signal from the control circuit 9 according to brightness of the projection surrounding (environment) and picture signal.

In case that projection surrounding is relatively bright and black level on the screen is determined depending on the light from outside, the auxiliary light bulb 17 is kept to be in the transmission state at all times, and the light flux modulated in the main light bulb 3 is emitted as it is, in the same manner as the foregoing example 1.

On the other hand, in case of sufficiently dark projection surrounding, the auxiliary light bulb 17 is driven by the luminance signal according to the picture signal, and the light flux modulated in the main light bulb 3 is further modulated. Described hereinafter is an example wherein an active matrix type liquid crystal light bulb of 20 in contrast is used as the main light bulb 3, while a simple matrix type liquid crystal light bulb of which contrast is 10 is used as the auxiliary light bulb 17, and wherein each picture element is driven between two gradations. In this case, each picture element of the auxiliary light bulb 17 is put in the transmission state when the luminance signal exceeds 10%, while being put in the scattering state when the luminance signal is 10% or less. By driving in this manner, the contrast of the projection picture of the projection type display itself may reach 200. In this operation, as there is less probability of overlapping the spacers of the two layers of light bulbs each other, the local light leak due to the spacer may be restrained to 10% of the entire luminance at the worst. As a result, while keeping substantially the same brightness of the projection picture at the time of displaying white, the contrast and the picture quality may be significantly improved.

In the driving operation described above, if the luminance signal is 10% or less, the luminance of the projected picture is discontinuously reduced, and the projected picture shows indefinitely blackened part. To overcome such a disadvantage, it is preferable to drive in such a manner that transmissivity of the corresponding picture elements of the main light bulb 3 is increased by ten times as compared with those of the mentioned case, with respect to the scattered picture elements of the auxiliary light bulb due to the luminance signal being 10% or less, whereby luminance variation in the projected picture is continuous even when the luminance signal is 10% or less, and a projected picture of excellent picture quality free from indefinitely blackened part may be achieved.

EXAMPLE 3

A further projection type display according to example 3 of the invention is hereinafter described. Arrangement of the projection type display of this example is substantially the same as the foregoing example 1 shown in FIG. 1, except that an active matrix type liquid crystal light bulb of the same arrangement as the main light bulb 3 as shown in FIG. 5 is used as the auxiliary light bulb 17.

The light flux incoming to the auxiliary light bulb 17 is further transmitted otherwise scattered for each picture element by the driving signal from the control circuit 9 according to brightness of the projection surrounding and picture signal.

In case that projection surrounding is relatively bright and black level on the screen is determined depending on the light from outside, the auxiliary light bulb 17 being an active matrix type liquid crystal light bulb is kept to be in a transmission state at all times, and the light flux modulated in the main light bulb 3 being also an active matrix type liquid crystal light bulb is emitted as it is, in the same manner as the foregoing example 1.

On the other hand, in case of sufficiently dark projection surrounding, the auxiliary light bulb 17 is driven by the same picture signal as that of the main light bulb, and the entire light flux modulated in the main light bulb 3 is further modulated. Described hereinafter is an example wherein active matrix type liquid crystal light bulbs of which contrast is 20 are used respectively as the main light bulb 3 and as the auxiliary light bulb 17. In this case, the two light bulbs are both driven by a luminance signal equivalent to a square root of the transmissivity of the picture to be displayed. For example, when it is intended to achieve a luminance corresponding to 50% of the maximum luminance in a projected picture, both light bulbs are driven so that transmissivity is 71% of the maximum transmissivity. By driving in this manner, luminance of the picture varies naturally, and contrast of the projected picture of the projection type display itself may reach 400. In this operation, as there is less probability of overlapping the spacers of the two layers of light bulbs each other, the local light leak due to the spacer may be restrained to 5% of the entire luminance at the worst. As a result, while keeping substantially the same brightness of the projection picture at the time of displaying white, the contrast and the picture quality may be significantly improved.

Although the auxiliary light bulb 17 used in the transmission state or in the scattering state according to the projection surrounding and the picture signal is disposed downstream the main light bulb 3 in the foregoing examples, the same advantage may be also achieved by disposing the auxiliary light bulb 17 upstream the main light bulb 3. Although a pair of light bulbs comprising the main light bulb 3 and the auxiliary light bulb 17 are used without branching the light flux by color in the foregoing examples, it is also preferable that the light flux is branched by color and the main light bulb 3 is used for each color of light flux. The same advantage may be achieved as far as the auxiliary light bulb 17 is disposed corresponding to the main light bulb 3 at least in one light flux.

Although the main light bulb 3 and the auxiliary light bulb 17 are spaced separately from each other, it is also preferable that the two layers of light bulbs may be disposed in close contact with each other, in which case the same advantage is achieved as a matter of course. Instead of disposing the two layers of light bulbs in close contact, it is preferable that one glass substrate of the main light bulb 3 serves also as that of the auxiliary light bulb 17, in which the same advantage is achieved.

It is understood that the foregoing description is preferred embodiments of the disclosed invention and that various changes and modifications may be made in the invention without departing from the spirit and scope thereof.

What is claimed is:

1. A projection type display comprising:
   a light source for emitting light flux;
   a liquid crystal light bulb having a main light bulb in which a light flux is emitted from said light source and transmitted otherwise scattered therethrough by a first control signal according to a display picture image formed, and an auxiliary light bulb in which the light flux is transmitted therethrough otherwise scattered by a second control signal;
   a diaphragm arranged at a location where the light flux transmitting through said liquid crystal light bulb is condensed by a condensing lens;
   a projecting lens by which the light flux transmitting through said liquid crystal light bulb is enlargedly projected after passing through said diaphragm;
   a screen on which the light flux enlargedly projected by said projecting lens is formed into a picture image; and
   a control circuit for generating the first control signal and the second control signal.

2. A projection type display according to claim 1, wherein said main light bulb is disposed upstream said auxiliary light bulb, whereby the auxiliary light bulb is irradiated with the light flux transmitted or scattered through said main light bulb.

3. A projection type display according to claim 1, wherein said main light bulb is disposed downstream said auxiliary light bulb, whereby the main light bulb is irradiated with the light flux transmitted or scattered through said auxiliary light bulb.

4. A projection type display according to claim 1, wherein one glass substrate of said main light bulb serves also as one glass substrate of said auxiliary light bulb to be commonly used.

5. A projection type display according to claim 1, said main light bulb is an active matrix type liquid crystal light bulb in which switching device and transparent electrode are disposed in a form of matrix.

6. A projection type display according to claim 1, said auxiliary light bulb is an active matrix type liquid crystal light bulb in which switching device and transparent electrodes are disposed in a form of matrix.

7. A projection type display according to claim 1, said auxiliary light bulb is a single element type liquid crystal light bulb.

8. A projection type display according to claim 1, said auxiliary light bulb is a simple matrix type liquid crystal light bulb in which upper and lower striped transparent electrodes are orthogonal each other.

* * * * *